United States Patent
Hwang et al.

(10) Patent No.: US 8,284,687 B2
(45) Date of Patent: Oct. 9, 2012

(54) APPARATUS AND METHOD FOR RATE CONTROL IN A BROADBAND WIRELESS COMMUNICATION SYSTEM

(75) Inventors: Ki-Hwan Hwang, Seoul (KR);
Sung-Kwon Jo, Suwon-si (KR);
Jae-Hyok Lee, Yongin-si (KR);
Myong-Hee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 12/315,384

(22) Filed: Dec. 3, 2008

(65) Prior Publication Data

US 2009/0141673 A1 Jun. 4, 2009

(51) Int. Cl.
*H04W 72/04* (2009.01)
*H04W 28/20* (2009.01)
*H04W 28/22* (2009.01)
*G08C 25/02* (2006.01)

(52) U.S. Cl. ............... 370/252; 370/468; 455/452.2; 714/748

(58) Field of Classification Search .................. 370/252, 370/278, 328, 436, 468; 455/422.1, 450, 455/452.1, 452.2; 714/748
See application file for complete search history.

(56) References Cited

U.S. PATENT DOCUMENTS

| 7,359,327 | B2 * | 4/2008 | Oshiba ................... 370/235 |
| 7,817,669 | B2 * | 10/2010 | Pani et al. .............. 370/474 |
| 7,933,195 | B2 * | 4/2011 | Kim et al. .............. 370/204 |
| 2007/0110002 | A1 | 5/2007 | Yang et al. |
| 2008/0039129 | A1 * | 2/2008 | Li et al. ................ 455/522 |
| 2008/0043619 | A1 * | 2/2008 | Sammour et al. ....... 370/231 |
| 2008/0043651 | A1 * | 2/2008 | Okamoto et al. ........ 370/310 |
| 2008/0081655 | A1 * | 4/2008 | Shin et al. .............. 455/522 |
| 2008/0123595 | A1 * | 5/2008 | Lindheimer et al. ..... 370/331 |
| 2008/0159192 | A1 * | 7/2008 | Lee et al. ............... 370/310 |
| 2009/0010211 | A1 * | 1/2009 | Sumasu et al. .......... 370/329 |
| 2009/0161613 | A1 * | 6/2009 | Kent et al. ............. 370/329 |

FOREIGN PATENT DOCUMENTS

| EP | 1845742 A1 * | 10/2007 |
| KR | 10-2005-0066266 | 6/2005 |
| KR | 10-2007-0050579 | 5/2007 |
| KR | 10-2008-0064504 | 7/2008 |

* cited by examiner

*Primary Examiner* — Chi Pham
*Assistant Examiner* — Ahmed Elallam

(57) ABSTRACT

An apparatus and method for rate control in a wireless communication system are provided. The apparatus includes a preprocessor, a rate controller, a determiner, and a transmitter. The preprocessor determines feedback information on a physical layer packet using a feedback message of MAC ARQ. The rate controller updates a CQI reported from a receiver using the determined feedback information. The determiner determines an MCS using the updated CQI. The transmitter transmits data using the determined MCS.

18 Claims, 4 Drawing Sheets

APPARATUS AND METHOD FOR RATE CONTROL IN A BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Dec. 3, 2007 and assigned Serial No. 10-2007-0124179, the entire disclosure of which is herein incorporated by reference.

FIELD OF THE INVENTION

The present invention relates to a broadband wireless communication system. More particularly, the present invention relates to an apparatus and method for rate control in a broadband wireless communication system.

BACKGROUND OF THE INVENTION

Mobile communication systems employ a Hybrid Automatic Repeat reQuest (HARQ) technique that is a physical layer packet retransmission algorithm in order to increase a downlink or uplink throughput. In a description of a downlink as an example, in a system employing the HARQ technique, a mobile station (MS) determines if packet reception is success or failure through an error check for a packet received from a base station (BS), and sends an Acknowledgement or Negative Acknowledgement (ACK or NACK) response depending on the determination result. Upon receiving the ACK, the BS transmits a next packet (i.e., a new packet) to the MS. Upon receiving the NACK, the BS retransmits a previous packet to the MS. At this time, the MS stores a previously received packet in a buffer. When the same packet is retransmitted by the BS, the MS combines the retransmitted packet with the previous packet and demodulates the combined data. As such, the HARQ technique has an advantage of increasing the probability of successful packet reception, thus improving a link throughput.

A transmission rate is controlled in order to satisfy a Carrier to Interference and Noise Ratio (CINR) value that is adaptive to changing channel conditions. A system has a plurality of link tables optimized to a movement speed and a surrounding environment. The BS determines a transmission method according to a CINR (i.e., a Channel Quality Indicator (CQI)) received from the MS, using each different link table depending on a channel model. The link table is a table predefining a data transmission method based on the CINR. The link table defines a CINR value that satisfies a Packet Error Rate (PER) of 1% at each Modulation and Coding Scheme (MCS) level according to a channel change.

FIG. 1 illustrates a signal flow between a BS and an MS for determining an MCS level according to the conventional art.

Referring to FIG. 1, in step 101, a BS 110 sends a request for CQI to an MS 120. If so, in step 103, the MS 120 estimates a downlink channel using a pilot signal or preamble signal, etc., received from the BS 110. In step 105, the MS 120 reports the estimated CQI to the BS 110. The CQI can be a channel coefficient or the CINR. Then, in step 107, the BS 110 determines a suitable MCS level through a comparison between the CINR, etc., reported from the MS 120 and the link table. Then, in step 109, the BS 110 modulates downlink data at the determined MCS level and transmits the modulated data to the MS 120.

The link table is expressed by a CINR critical value for each MCS level. The critical value is determined experimentally on the assumption of a plurality of channel conditions. Thus, the link table does not perfectly reflect all conditions in which a system actually operates. If a difference between the link table and actual system operation conditions is generated, transmission efficiency may reduce although an MCS level is determined using a CINR measured by the MS. In order to solve this problem, the BS can apply an Outer-Loop Rate Control (OLRC).

FIG. 2 illustrates a signal flow between a BS and an MS for determining an MCS level using OLRC according to the conventional art.

Referring to FIG. 2, in step 201, a BS 110 sends a request for CQI to an MS 120. If so, in step 203, the MS 120 estimates a downlink channel using a pilot signal or preamble signal, etc., received from the BS 110. In step 205, the MS 120 reports the estimated CQI to the BS 110. The CQI can be a channel coefficient or the CINR. Then, in step 207, the BS 110 determines a suitable MCS level through a comparison between the CINR, etc. reported from the MS 120 and the link table. Then, in step 209, the BS 110 modulates downlink data at the determined MCS level and transmits the modulated data to the MS 120.

In step 211, the MS 102 performs an error check for downlink data received from the BS 110 and determines if reception is succeeded or failed depending on the error check result. In step 213, the MS 120 feeds back an ACK or NACK to the BS 110 depending on the success or failure reception. When reception is succeeded, the MS 120 feeds back the ACK and, when reception is failed, feeds back the NACK. In step 215, the MS 120 estimates a channel and, in step 217, transmits the estimated CQI to the BS 110.

Then, in step 219, the BS 110 performs OLRC using the feedback signal (i.e., the ACK or NACK), the CINR, etc.

In step 221, for an MS supporting HARQ, the BS 110 can determine an MCS level using a CQI and HARQ ACK/NACK message fed back from the MS. However, for an MS not supporting HARQ (hereinafter, referred to as "non-HARQ MS"), the BS 110 has to determine an MCS using only a CQI. Thus, OLRC cannot be applied. Therefore, a difference with system operation conditions is generated, causing a problem of reducing transmission efficiency.

SUMMARY OF THE INVENTION

To address the above-discussed deficiencies of the prior art, it is a primary aspect of the present invention to substantially solve at least the above problems and/or disadvantages and to provide at least the advantages described below. Accordingly, an aspect of the present invention is to provide an apparatus and method for adaptively reflecting a channel state for efficient rate control in a wireless communication system.

Another aspect of the present invention is to provide an apparatus and method for performing an Outer-Loop Rate Control (OLRC) using an Automatic Repeat reQuest (ARQ) of a Media Access Control (MAC) layer in a wireless communication system.

A further aspect of the present invention is to provide an apparatus and method for determining a Modulation and Coding Scheme (MCS) level for a non-HARQ MS through OLRC based on an ARQ of a MAC layer in a wireless communication system.

According to one aspect of the present invention, an apparatus for rate control in a wireless communication system is provided. The apparatus includes a preprocessor, a rate controller, a determiner, and a transmitter. The preprocessor determines feedback information on a physical layer packet using a feedback message of a Media Access Control (MAC) Automatic Repeat reQuest (ARQ). The rate controller updates a Channel Quality Indicator (CQI) reported from a receiver using the determined feedback information. The determiner determines a Modulation and Coding Scheme (MCS) using the updated CQI. The transmitter transmits data using the determined MCS.

According to another aspect of the present invention, a method for rate control in a wireless communication system is provided. The method includes determining feedback information on a physical layer packet using a feedback message of a Media Access Control (MAC) Automatic Repeat reQuest (ARQ), updating a Channel Quality Indicator (CQI) reported from a receiver using the determined feedback information, determining a Modulation and Coding Scheme (MCS) using the updated CQI, and transmitting data using the determined MCS.

Other aspects, advantages, and salient features of the invention will became apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION OF THE INVENTION

Figure 1:
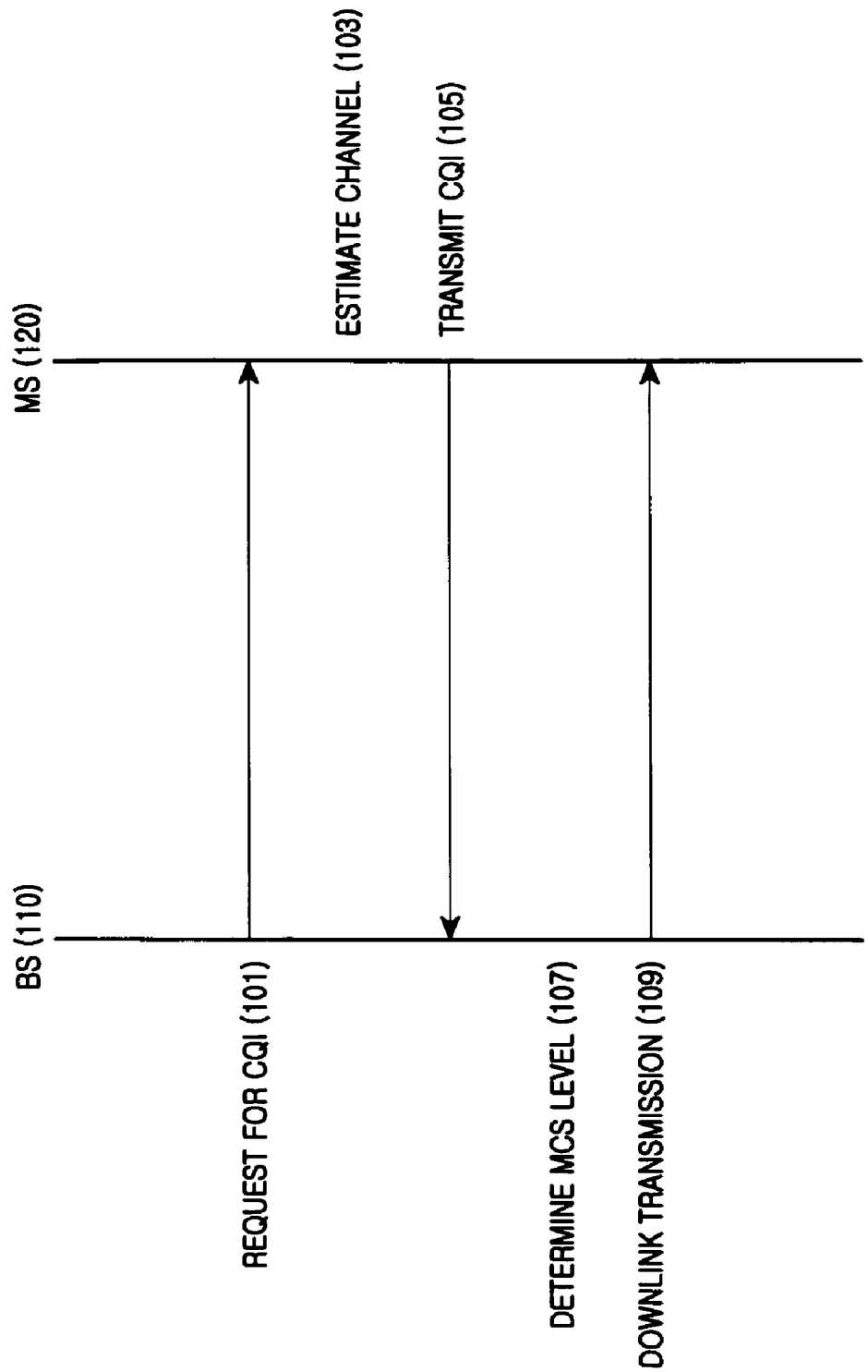
FIG. 1 illustrates a signal flow between a base station (BS) and a mobile station (MS) for determining a Modulation and Coding Scheme (MCS) level according to the conventional art.
Figure 2:
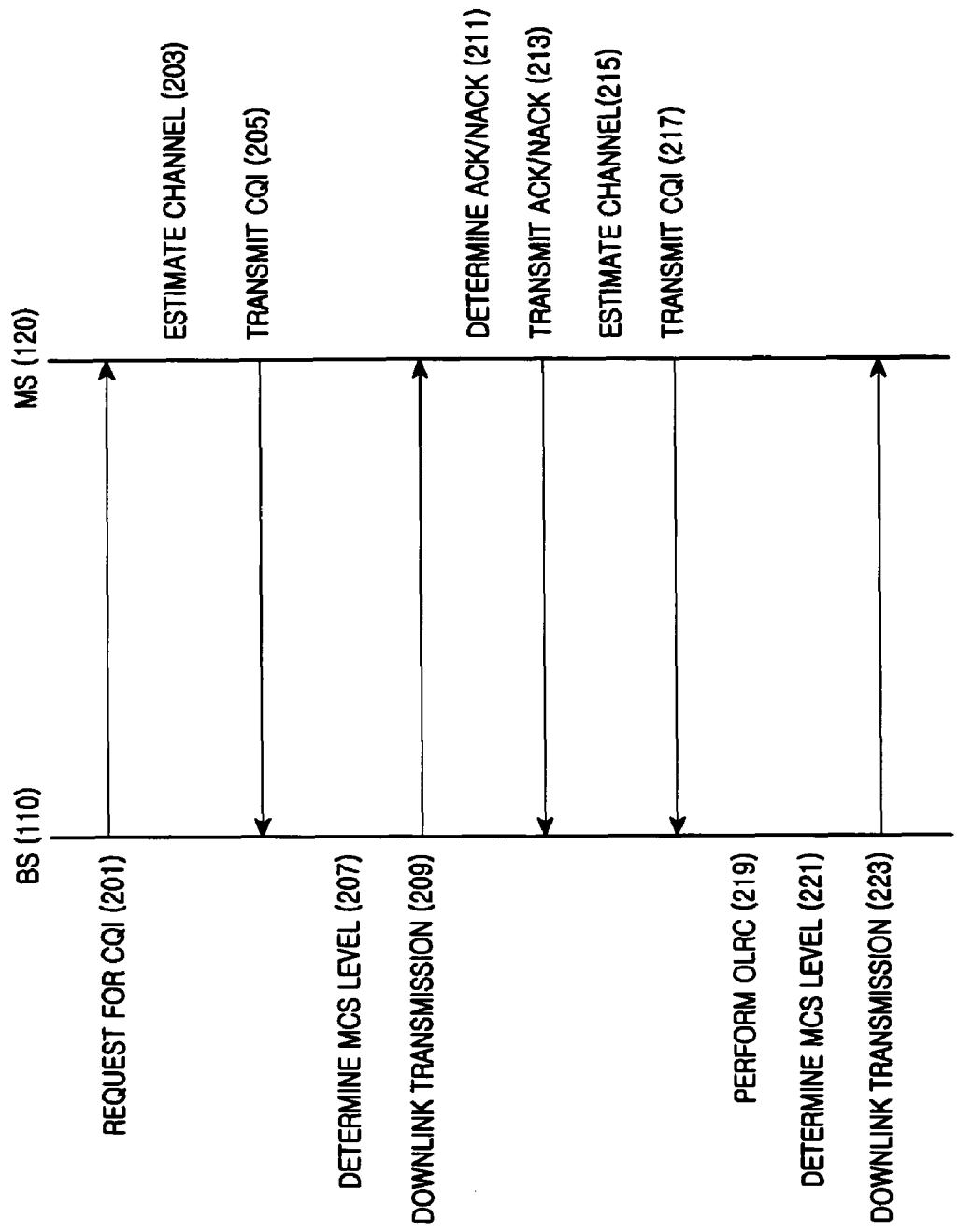
FIG. 2 illustrates a signal flow between a BS and an MS for determining an MCS level using an Outer-Loop Rate Control (OLRC) according to the conventional art.
Figure 3:
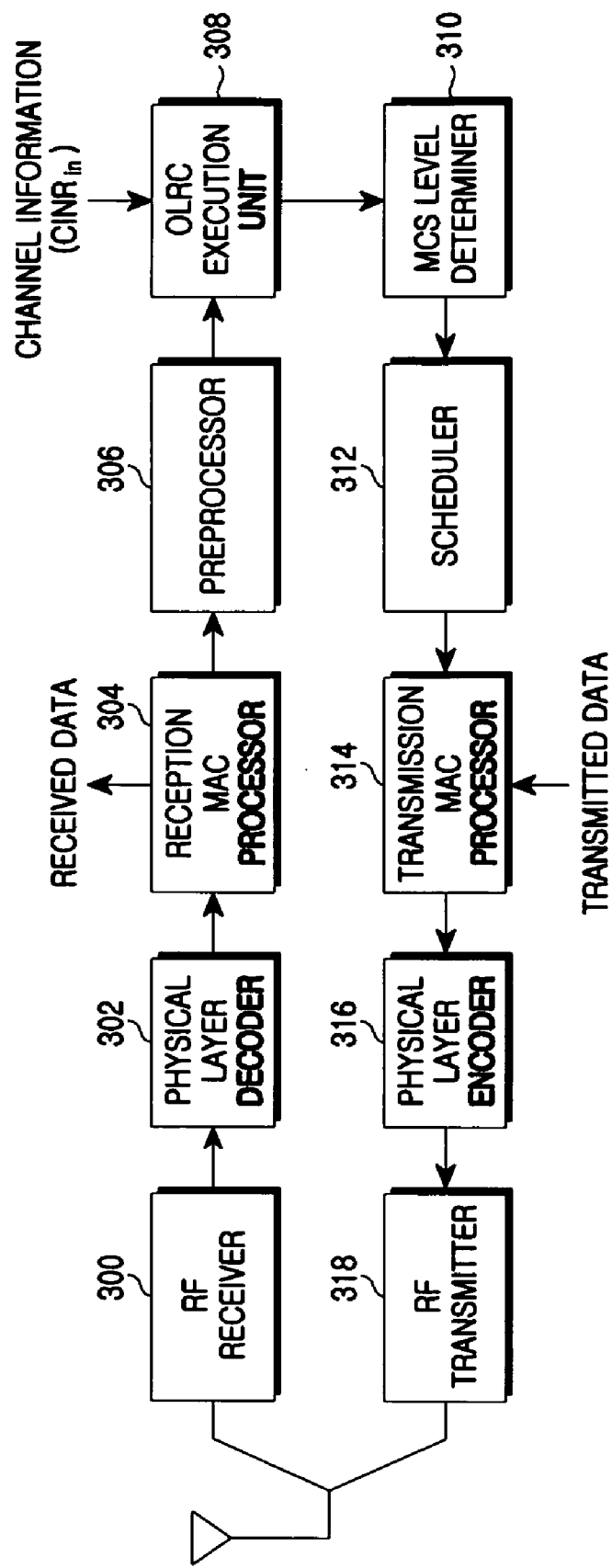
FIG. 3 is a block diagram illustrating a construction of a BS for non-HARQ OLRC according to an exemplary embodiment of the present invention.
Figure 4:
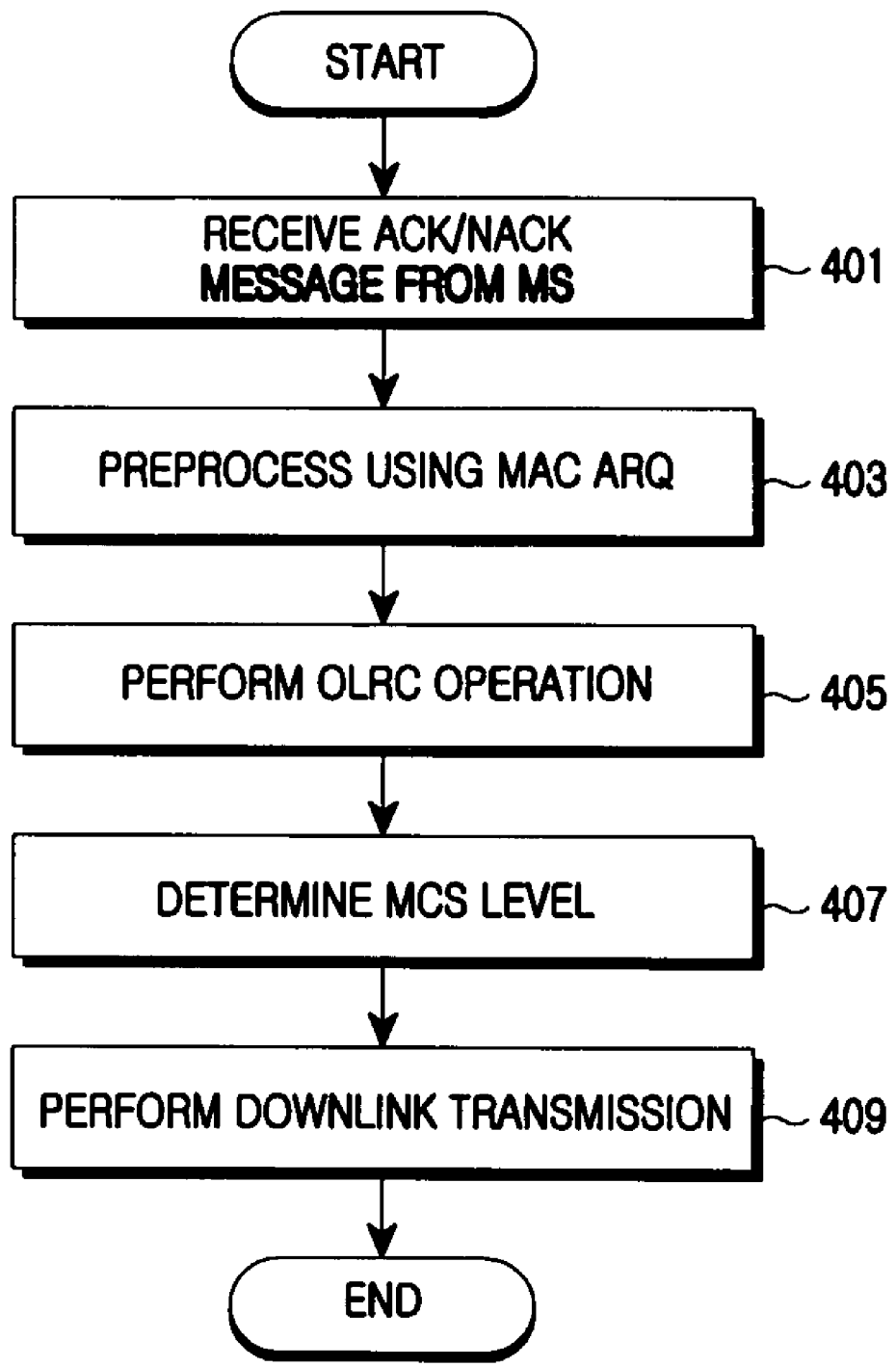
FIG. 4 is a flowchart illustrating an operation of a BS for non-HARQ OLRC according to an exemplary embodiment of the present invention.

FIGS. 3 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

It is to be understood that the singular forms "a," "an," and "the" include plural referents unless the context clearly dictates otherwise. Thus, for example, reference to "a component surface" includes reference to one or more of such surfaces.

An exemplary method for using an Automatic Repeat reQuest (ARQ) of a Media Access Control (MAC) layer in an Outer-Loop Rate Control (OLRC) is described below.

The following description is made in the context of an Orthogonal Frequency Division Multiplexing/Orthogonal Frequency Division Multiple Access (OFDM/OFDMA) broadband wireless access system. However, it is to be understood that is merely for the sake of the convenience and that the present invention is not limited to an OFDM-based system. Thus, it should be clearly understood that the present invention is also applicable to any other wireless communication systems performing ARQ.

FIG. 3 is a block diagram illustrating a construction of a base station (BS) for non-HARQ OLRC according to an exemplary embodiment of the present invention.

As shown in FIG. 3, the BS includes a radio frequency (RF) receiver 300, a physical layer decoder 302, a reception MAC processor 304, a preprocessor 306, an OLRC execution unit 308, an MCS level determiner 310, a scheduler 312, a transmission MAC processor 314, a physical layer encoder 316, and an RF transmitter 318.

An exemplary embodiment of the present invention can perform OLRC using an ACKnowledgement/Negative ACKnowledgement (ACK/NACK) of MAC ARQ for a non-HARQ MS. Thus, an exemplary embodiment of the present invention can determine an MCS level by reflecting reception conditions (i.e., channel conditions) of an MS.

Referring to FIG. 3, the RF receiver 300 converts an RF signal received through an antenna into a baseband signal, and converts the baseband signal into digital sample data.

The physical layer decoder 302 decodes sample data from the RF receiver 300. Assuming an OFDM system, the physical layer decoder 302 can include a Fast Fourier Transform (FFT) operator, a demodulator, a deinterleaver, a channel decoder, etc. The channel decoder provides decoded data for a physical layer burst to the reception MAC processor 304. The physical layer burst can include at least one MAC Protocol Data Unit (PDU).

The reception MAC processor 304 detects MAC PDUs in decoded data from the physical layer decoder 302 and performs header analysis and Cyclic Redundancy Check (CRC) for the MAC PDUs. That is, the reception MAC processor 304 checks if a corresponding MAC PDU is a traffic or a control message (i.e., a MAC management message) through header analysis. If the MAC PDU is a traffic, the reception MAC processor 304 assembles the received MAC PDUs into a Service Data Unit (SDU) and forwards the SDU to an upper layer. If the MAC PDU is a control message, the reception MAC processor 304 determines if the control message is of any kind. If it is determined that the control message is an ACK/NACK message, the reception MAC processor 304 provides an ARQ feedback message (i.e., an ACK/NACK message) received from an MS and a size of a corresponding downlink MAC PDU to the preprocessor 306.

Generally, if a plurality of PDUs are included in a single downlink burst, a plurality of ACK/NACK messages or ACK/NACK bitmap message are received from an MS. The preprocessor 306 determines a plurality of feedback messages received corresponding to a single burst as either ACK or NACK, and provides the determined ACK or NACK to the OLRC execution unit 308.

In detail, the preprocessor 306 inputs a feedback message (i.e., an ACK/NACK message) of MAC ARQ received from a non-HARQ MS and a size of a corresponding PDU, and determines an input parameter for OLRC using the feedback message of MAC ARQ.

The physical layer burst can include at least one MAC PDU. In other words, a single burst can be comprised of either a single MAC PDU or a plurality of MAC PDUs. MAC ARQ is performed in a unit of MAC PDU. Thus, a non-HARQ MS performs an error check in the unit of MAC PDU, and transmits a feedback message (i.e., an ACK/NACK message) according to the MAC ARQ to the BS.

An operation algorithm of the preprocessor 306 can be flexibly implemented depending on a system. For example, the preprocessor 306 determines a predetermined critical value and, if number of NACK messages of MAC ARQ is equal to or more than the critical value, determines feedback information on a physical layer packet as a NACK. If the number is less than the critical value, the preprocessor 306 can determine as an ACK. For another example, if there is any single NACK message among MAC ARQ feedback messages received corresponding to a downlink burst, the preprocessor 306 can determine feedback information on a physical layer packet (the downlink burst) as a NACK. For further another example, the preprocessor 306 can compare a total number of bytes of PDUs corresponding to an ACK message with a total number of bytes of PDUs corresponding to a NACK message, and output a feedback information (ACK or NACK) corresponding to more number of bytes to the OLRC execution unit 308.

The OLRC execution unit 308 performs OLRC using Equations 1 and 2 below, with feedback information (ACK or NACK) from the preprocessor 306 and channel information (CINRin) reported from an MS. In other words, the OLRC execution unit 308 updates a CINR using Equations 1 and 2 below, and provides the updated CINR value to the MCS level determiner 310. That is, if feedback information from the preprocessor 306 is an ACK, the OLRC execution unit 308 controls a CINR as in Equation 1, and in the case of a NACK, the OLRC execution unit 308 controls the CINR as in Equation 2:

$$CINRout=CINRin+Offset$$

$$Offset=Offset+UP,\ UP=DOWN*(Target\ PER)/(1-Target\ PER).\quad [Eqn.\ 1]$$

$$CINRout=CINRin+Offset$$

$$(Offset=Offset-DOWN).\quad [Eqn.\ 2]$$

Here, the "CINRin", which is an OLRC input value, represents a CINR reported from an MS, the "CINRout" represents an OLRC output value, and the "Target PER" represents a target packet error rate. The "Offset" represents an offset value for correcting CINR. As appreciated from Equations 1 and 2, if feedback information is an ACK, the "CINRin" increases and, if feedback information is a NACK, the "CINRin" decreases. In other words, if feedback information is the ACK, the OLRC execution unit 308 updates an offset value by adding an UP value to a previous offset value, and updates a CINR value by adding the updated offset value to the CINRin value. Inversely, if feedback information is the NACK, the OLRC execution unit 308 updates an offset value by subtracting a DOWN value from a previous offset value, and updates a CINR value by adding the updated offset value to the CINRin value. In general, the DOWN is a fixed constant and the UP is determined depending on the Target PER. Accordingly, an increase of the Target PER leads to an increase of the UP and therefore, the BS can generally offensively allocate an MCS level. Inversely, a decrease of the Target PER leads to a decrease of the UP and therefore, the BS can conservatively allocate an MCS level. Finally, the BS determines an MCS level of downlink data through a comparison between the CINRout that is the OLRC output value and a link table.

The MCS level determiner 310 determines an MCS level through a comparison between an updated CINR value from the OLRC execution unit 308 and a link table. The scheduler 312 performs resource scheduling with an MCS level for a corresponding MS from the MCS level determiner 310 and controls corresponding constituent elements depending on the scheduling result.

The transmission MAC processor 314 constructs MS data, which is determined for downlink transmission depending on the scheduling result, as a burst and provides the burst to the physical layer encoder 316. The physical layer encoder 316 encodes the burst from the transmission MAC processor 314. The physical layer encoder 316 can include a channel encoder, an interleaver, a modulator, an Inverse Fast Fourier Transform (IFFT) operator, etc. The channel encoder and the modulator perform channel encoding and modulation according to an MCS level determined in the MCS level determiner 310. The RF transmitter 318 converts baseband data from the physical layer encoder 316 into an analog signal, and converts the baseband analog signal into an RF signal for transmission to a downlink.

FIG. 4 is a flow diagram illustrating an operation of a BS for non-HARQ OLRC according to an exemplary embodiment of the present invention.

Referring to FIG. 4, in step 401, the BS receives a MAC ARQ feedback message for a downlink burst from an MS. The downlink burst includes at least one MAC PDU. Thus, the BS can receive at least one ARQ feedback message from the MS for a single downlink burst.

Then, in step 403, the BS performs a preprocess using the at least one MAC ARQ feedback message received from the MS. That is, the BS identifies a MAC ARQ feedback message (i.e., an ACK/NACK message) received from a non-HARQ MS and a size of a corresponding PDU, and determines OLRC input parameter (ACK or NACK). For example, the BS determines a predetermined critical value and, if number of NACK messages of MAC ARQ is equal to or more than the critical value, determines feedback information on a physical layer packet as a NACK. If the number is less than the critical value, the BS can determine feedback information on a physical layer packet as an ACK. For another example, if there is any single NACK message among MAC ARQ feedback messages received corresponding to a downlink burst, the BS can determine feedback information on a physical layer packet (the downlink burst) as a NACK. For further another example, the BS can compare a total number of bytes of PDUs corresponding to an ACK message with a total number of bytes of PDUs corresponding to a NACK message and determine a feedback information corresponding to more number of bytes as an OLRC input parameter.

In step 405, the BS performs OLRC expressed in Equations 1 and 2 with the determined feedback information (i.e., the ACK or NACK) and a CQI received from the MS, and updates a CINR. Then, in step 407, the BS determines an MCS level through a comparison between the updated CINR and a link table and then, in step 409, transmits data to a downlink using the determined MCS level.

As described above, an exemplary embodiment of the present invention can reflect channel conditions in an MS not supporting HARQ and determine an MCS level with more efficiency, by using MAC ARQ for OLRC in a wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for rate control in a wireless communication system, the apparatus comprising:
   a preprocessor configured to determine feedback information on a physical layer packet using a feedback message of a Media Access Control (MAC) Automatic Repeat reQuest (ARQ);
   a rate controller configured to update a Channel Quality Indicator (CQI) reported from a receiver using the determined feedback information;
   a determiner configured to determine a Modulation and Coding Scheme (MCS) using the updated Channel Quality Indicator; and
   a transmitter configured to transmit data using the determined Modulation and Coding Scheme,
   wherein the preprocessor is further configured to determine the feedback information on the physical layer packet based on a comparison of a size of at least one MAC Protocol Data Unit corresponding to a Negative ACKnowledgement with a size of at least one MAC Protocol Data Unit corresponding to an ACKnowledgement.

2. The apparatus of claim 1, wherein the feedback information on the physical layer packet is an ACKnowledgement or Negative ACKnowledgement (ACK or NACK).

3. The apparatus of claim 1, wherein the physical layer packet comprises at least one MAC layer packet.

4. The apparatus of claim 1, wherein, if the number of Negative ACKnowledgements among feedback messages of at least one MAC Protocol Data Unit (PDU) for the physical layer packet is equal to or more than a critical value, the preprocessor is further configured to determine that the feedback information on the physical layer packet is a Negative ACKnowledgement.

5. The apparatus of claim 1, wherein, if the number of Negative ACKnowledgements among feedback messages of at least one MAC Protocol Data Unit for the physical layer packet is one or more, the preprocessor is further configured to determine that the feedback information on the physical layer packet is a Negative ACKnowledgement.

6. The apparatus of claim 1, wherein the preprocessor determines the feedback information on the physical layer packet, using at least one feedback message of at least one MAC Protocol Data Unit for the physical layer packet and a size of at least one MAC Protocol Data Unit corresponding to the feedback message.

7. The apparatus of claim 1, wherein the preprocessor is further configured to compare a total size of at least one MAC Protocol Data Unit corresponding to a Negative ACKnowledgement among feedback messages of at least one MAC Protocol Data Unit for the physical layer packet with a total size of at least one MAC Protocol Data Unit corresponding to an ACKnowledgement, and determine a feedback value corresponding to a larger size as the feedback information on the physical layer packet.

8. The apparatus of claim 1, wherein the MCS determiner is further configured to determine a Modulation and Coding Scheme through a comparison between the updated Channel Quality Indicator and a link table.

9. The apparatus of claim 1, wherein, if the determined feedback information is an ACKnowledgement, the rate controller is further configured to update the Channel Quality Indicator using Equation 1 below and, if the determined feedback information is a Negative ACKnowledgement, update the Channel Quality Indicator using Equation 2;
   wherein Equation 1 is defined as: CINRout=CINRin+Offset; Offset=Offset+UP, UP=DOWN*(Target PER)/(1−Target PER) and
   wherein Equation 2 is defined as: CINRout=CINRin+Offset (Offset=Offset−DOWN),
   where Carrier to Interference and Noise Ratio input (CINRin) denotes Channel Quality Indicator received from receiver, Carrier to Interference and Noise Ratio output (CINRout) denotes updated Channel Quality Indicator, Target PER denotes target packet error rate, DOWN denotes constant value, and Offset denotes offset for correcting Channel Quality Indicator.

10. A method for rate control in a wireless communication system, the method comprising:
    determining feedback information on a physical layer packet using a feedback message of a Media Access Control (MAC) Automatic Repeat reQuest (ARQ);
    updating a Channel Quality Indicator (CQI) reported from a receiver using the determined feedback information;
    determining a Modulation and Coding Scheme (MCS) using the updated CQI; and
    transmitting data using the determined Modulation and Coding Scheme,
    wherein determining the feedback information on the physical layer packet further comprises:
    determining the feedback information on the physical layer packet based on a comparison of a size of at least one MAC Protocol Data Unit corresponding to a Negative ACKnowledgement with a size of at least one MAC Protocol Data Unit corresponding to an ACKnowledgement.

11. The method of claim 10, wherein the feedback information on the physical layer packet is an ACKnowledgement or Negative ACKnowledgement (ACK or NACK).

12. The method of claim 10, wherein the physical layer packet comprises at least one MAC layer packet.

13. The method of claim 10, wherein the determining of the feedback information comprises:
    determining if the number of Negative ACKnowledgements among feedback messages of at least one MAC Protocol Data Unit for the physical layer packet is equal to or more than a critical value; and
    if the number of Negative ACKnowledgements is equal to or more than the critical value, determining that the feedback information on the physical layer packet is a Negative ACKnowledgement.

14. The method of claim 10, wherein the determining of the feedback information comprises:

determining if the number of Negative ACKnowledgements among feedback messages of at least one MAC Protocol Data Unit for the physical layer packet is one or more; and if the number of Negative ACKnowledgements is one or more, determining that the feedback information on the physical layer packet is a Negative ACKnowledgement.

15. The method of claim 10, wherein the determining of the feedback information comprises acquiring a size of a MAC Protocol Data Unit corresponding to each of feedback messages of at least one MAC Protocol Data Unit for the physical layer packet.

16. The method of claim 15, wherein the determining of the feedback information further comprises:

comparing a total size of at least one MAC Protocol Data Unit corresponding to a Negative ACKnowledgement among the feedback messages of at least one MAC Protocol Data Unit with a total size of at least one MAC Protocol Data Unit corresponding to an ACKnowledgement; and determining a feedback value corresponding to a larger size as the feedback information on the physical layer packet.

17. The method of claim 10, wherein the determining of the Modulation and Coding Scheme comprises determining a Modulation and Coding Scheme through a comparison between the updated Channel Quality Indicator and a link table.

18. The method of claim 10, wherein the updating of the Channel Quality Indicator comprises:

if the determined feedback information is an ACKnowledgement, updating the Channel Quality Indicator using Equation 1; and if the determined feedback information is a Negative ACKnowledgement, updating the Channel Quality Indicator using Equation 2;

wherein Equation 1 is defined as:

$$CINRout = CINRin + Offset$$

(Offset=Offset+UP, UP=DOWN*(Target PER)/(1−Target PER) and wherein Equation 2 is defined as:

$$CINRout = CINRin + Offset;$$

(Offset=Offset−DOWN), where Carrier to Interference and Noise Ratio input (CINRin) denotes Channel Quality Indicator received from receiver, Carrier to Interference and Noise Ratio output (CINRout) denotes updated Channel Quality Indicator, Target PER denotes target packet error rate, DOWN denotes constant value, and Offset denotes offset for correcting Channel Quality Indicator.

* * * * *